United States Patent [19]

Labana et al.

[11] 4,091,048

[45] * May 23, 1978

[54] POWDER COATING COMPOSITIONS CONTAINING GLYCIDYL ESTER COPOLYMERS AND ORGANIC CARBOXYLIC ACID ANHYDRIDE CROSSLINKING AGENT

[75] Inventors: Santokh S. Labana, Dearborn Heights; Ares N. Theodore, Farmington, both of Mich.

[73] Assignee: Ford Motor Company, Dearborn, Mich.

[*] Notice: The portion of the term of this patent subsequent to Dec. 25, 1990, has been disclaimed.

[21] Appl. No.: 425,743

[22] Filed: Dec. 18, 1973

Related U.S. Application Data

[63] Continuation-in-part of Ser. No. 172,224, Aug. 16, 1971, Pat. No. 3,781,379.

[51] Int. Cl.$^2$ ............................................. C08L 63/00
[52] U.S. Cl. .............................. 260/836; 260/30.6 R; 260/31.8 E; 260/37 EP; 260/78.4 EP; 260/830 R; 260/DIG. 17; 427/27; 428/417; 428/418
[58] Field of Search .................. 260/836, 830 TW, 47, 260/78.4 EP, 830 R; 427/27

[56] References Cited

U.S. PATENT DOCUMENTS

| | | | |
|---|---|---|---|
| 2,857,354 | 10/1958 | Fang | 260/78.4 R |
| 3,058,947 | 10/1962 | Fryling | 260/831 |
| 3,070,564 | 12/1962 | Roeser | 260/836 |
| 3,222,419 | 12/1965 | Jubilee | 260/836 |
| 3,297,621 | 1/1967 | Taft | 260/836 |
| 3,514,419 | 5/1970 | Darlow | 260/836 |
| 3,541,055 | 11/1970 | Malamet | 260/78.4 EP |
| 3,595,944 | 7/1971 | Manning | 260/836 |
| 3,758,632 | 9/1973 | Labana | 260/836 |
| 3,781,379 | 12/1973 | Theodore | 260/836 |

OTHER PUBLICATIONS

Detroit Society for Paint Technology; Journal of Paint Technology, vol. 44, No. 565, Feb. 1962, pp. 30–37.

*Primary Examiner*—Theodore F. Pertilla
*Attorney, Agent, or Firm*—Roger L. May; Keith L. Zerschling

[57] ABSTRACT

Powder coating compositions are disclosed which, exclusive of pigments and other nonreactive components, comprise a coreactive mixture of: (A) a copolymer of between about 5 and about 20 weight percent of a glycidyl ester of a monoethylenically unsaturated acid and between about 95 to about 80 weight percent of other monoethylenically unsaturated monomers, said copolymer having a glass transition temperature in the range of 40° C to 90° C and a number average molecular weight ($\overline{M}_n$) of between about 2500 and about 8500; and (B) an organic carboxylic acid anhydride crosslinking agent, said anhydride being present in the amount of from about 0.4 to about 1.0 anhydride groups for each epoxy group in the copolymer.

18 Claims, No Drawings

POWDER COATING COMPOSITIONS CONTAINING GLYCIDYL ESTER COPOLYMERS AND ORGANIC CARBOXYLIC ACID ANHYDRIDE CROSSLINKING AGENT

This application is a continuation-in-part of application Ser. No. 172,224, filed Aug. 16, 1971, new U.S. Pat. No. 3,781,379, and relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints contain large amounts of solvents which must be volatilized after application, thus resulting in solvents escaping into the atmosphere and creating health and safety hazards as well as undesirable pollution problems. The powder coating compositions of this invention, on the other hand, release little, if any, volatile material when cured. In addition, the powders have good stability at room temperature, have fast cure times at elevated temperature and form hard coatings exhibiting excellent solvent resistance.

SUMMARY OF THE INVENTION

The powder coating compositions of this invention, exclusive of pigments and other nonreactive components, comprise a coreactable mixture of: (A) a copolymer of between about 5 and about 20 weight percent of a glycidyl ester of a monoethylenically unsaturated acid and between about 95 and about 80 weight percent of other monoethylenically unsaturated monomers, said copolymer having a glass transition temperature in the range of 40° C to 90° C and a number average molecular weight ($\overline{M}_n$) of between about 2500 and about 8500; and (B) a carboxylic acid anhydride crosslinking agent, said anhydride being present in the amount of from about 0.4 to about 1.0 anhydride groups for each epoxy group in the copolymer. In addition, the powder coating compositions may include additives such as catalysts, flow control agents, anti-static agents, pigments, plasticizers, etc.

PRIOR ART

The use of glycidyl methacrylate copolymers and dicarboxylic acid crosslinking agents in a liquid paint system is described in U.S. Pat. No. 2,857,354. However, the powder coating compositions of this invention are substantially different than the liquid paint compositions described in the examples of that patent. The difference can be best illustrated by attempting to prepare powder coating compositions by evaporating the solvents from the liquid paint systems described in the examples of the patent. Dry powders cannot be prepared from the compositions of Examples 4 and 5 of the patent. Powders prepared from the compositions of Examples 1, 2, 3 and 6, when deposited on a metal panel, do not fuse together to form a smooth and glossy film when the panels are baked at 150° to 200° C for 20 minutes. The baked coatings on test panels are not smooth, but rather, are rough. Also, the baked coatings exhibit very low gloss, poor adhesion and lack of flexibility. It, therefore, can be concluded that compositions which are generally suitable for liquid paints are not necessarily made suitable for powder paints merely by evaporating the solvents therefrom.

The use of a dicarboxylic acid as a crosslinking agent for glycidyl methacrylate terpolymers is mentioned in U.S. Pat. No. 3,058,947. In order to test these materials, compositions of Example VIII of the patent are dried by evaporating solvents under vacuum. The materials are ground to pass through a 200 mesh screen. Samples of the ground powder are deposited on metal panels and baked at 160° C for 45 minutes. The coatings obtained show an abundance of craters, are inferior in gloss and smoothness, and lack the impact properties described in Example VII. It is, therefore, concluded that there is a substantial difference in paint films produced on a panel when the coating is produced on one hand by a liquid system and, on the other hand, by a powder system. Other improvements specific to the powders are needed in order to obtain paints of acceptable quality. The reason for the difference in properties and appearance between powder coatings derived by solvent evaporation from such liquid coatings and the liquid coatings themselves is not clear. It is, however, certain that the powder obtained by drying such a liquid paint composition is not useful as a powder coating composition.

DETAILED DESCRIPTION OF THE INVENTION

Epoxy Functional Copolymer

The principal material in the powder coating compositions of this invention is an epoxy functional copolymer which may be formed by conventional free radical induced polymerization of suitable unsaturated monomers. The term "copolymer" as used herein means a polymer of two or more different monomers.

The copolymers used in the invention contain between about 5 and about 20 weight percent, preferably between about 8 and about 15 weight percent of a glycidyl ester of a monoethylenically unsaturated carboxylic acid, e.g., glycidyl acrylate and glycidyl methacrylate. These monomers provide the copolymer with its pendant epoxy functionality.

The remainder of the monomers forming the epoxy-functional copolymer, i.e., between about 95 and about 80 weight percent, preferably between about 92 and about 85 weight percent, and most preferably 90 weight percent, are other monoethylenically unsaturated monomers. The monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total of copolymer monomers are esters of a $C_1$–$C_{12}$ monohydric alcohols and acrylic or methacrylic acid, e.g., methyl methacrylate, ethyl acrylate, butyl acrylate, butyl methacrylate, hexyl acrylate, 2-ethyl hexyl acrylate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile and vinyl acetate may be included in the copolymer as modifying monomers. However, when employed, these modifying monomers should constitute only between about 0 and about 35 weight percent of the monomers in the copolymer.

The epoxy functional copolymers used in these coating compositions have a glass transition temperature between about 40° C and about 90° C, preferably between about 50° C and about 80° C, and most preferably between about 55° C and 70° C. The molecular weight ($\overline{M}_n$) range for the copolymer may be between about 2500 and about 8500, preferably between about 3000 and about 6500, and more preferably between about 3000 and about 4000. A preferred copolymer for use in the coating compositions of this invention has a glass transition temperature between about 50° C and about 80° C and a molecular weight of between about 3,000 and about 6500. A still more preferred copolymer has a glass transition temperature between about 55° C and about 70° C and a molecular weight between about 3000 and about 4000.

In preparing the copolymer, the epoxy functional monomer and the remaining monoethylenically unsaturated monomers are mixed and reacted by conventional free radical initiated polymerization in such proportions as to obtain the copolymer desired. A large number of free radical initiators are known to the art and are suitable for this purpose. These include: benzoyl peroxide; lauryl peroxide; t-butylhydroxyperoxide; acetylcyclohexane sulfonyl peroxide; diisobutyryl peroxide; di-(2-ethylhexyl) peroxydicarbonate; diisopropyl peroxydicarbonate; t-butylperoxypivalate; decanoyl peroxide; azobis(2-methyl-propionitrile); etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a non-solvent for the copolymer such as hexane, octane, or water under suitable agitation conditions. The copolymer thus obtained is then further dried so that it contains less than 3 percent of the materials that volatilize at the temperatures used for baking the coatings. Alternatively, the copolymer can be obtained by evaporating the solvents under vacuum or by employing spray drying techniques.

These copolymers can also be prepared by emulsion polymerization, suspension polymerization, bulk polymerization or other suitable methods. In these methods of preparing the copolymers, chain transfer agents may be required to control the molecular weight of the copolymer to a desired range. However, when the chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coatings.

The molecular weight and molecular weight distribution of the epoxy functional copolymer is important in obtaining outstanding powder coating compositions. While the molecular weight ($\overline{M}_n$) ranges from about 2500 to about 8500, the copolymer component must not contain significant amounts of higher molecular weight fractions. No more than 5% of the copolymer should be of molecular weight greater than 20,000 and the molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

ANHYDRIDE CROSSLINKING AGENT

The crosslinking agent component of the powder coating composition of the invention is an organic carboxylic acid anhydride. The anhydride groups, which are present in the composition in an amount ranging from about 0.4 to about 1.0 anhydride groups for each epoxy group in the copolymer, react with the epoxy functionality on the copolymer during baking or curing to form a tough, resistant coating. The organic carboxylic acid anhydrides which may be employed as crosslinking agents include: anhydrides of both saturated and unsaturated aliphatic carboxylic acids containing between about 4 and about 20 carbon atoms; anhydrides of cyclic carboxylic acids including anhydrides of aromatic carboxylic acids as well as anhydrides of saturated and unsaturated alicyclic carboxylic acids; anhydrides of heterocyclic carboxylic acids; polymers of anhydrides of saturated and unsaturated aliphatic carboxylic acids; and mixtures of the same.

Among the many anhydrides of saturated aliphatic carboxylic acids which may be employed are: dodecenyl succinic anhydride; succinic anhydride; methyl succinic anhydride; cumylsuccinic anhydride; 2,3 dimethyl succinic anhydride; 2,2 dimethyl succinic anhydride; glutaric anhydride; 2,2 dimethyl glutaric anhydride; 2,3 dimethyl glutaric anhydride; and tricarballylic anhydride. Among the suitable anhydrides of unsaturated aliphatic carboxylic acids are: maleic anhydride; citraconic anhydride; itaconic anhydride; 2,3 dimethyl maleic anhydride; dichloromaleic anhydride; chlorendic anhydride; and bromomaleic anhydride.

As noted above, anhydrides of cyclic carboxylic acids including anhydrides of aromatic carboxylic acids as well as anhydrides of saturated and unsaturated alicyclic carboxylic acids may be employed. Suitable aromatic carboxylic acid anhydrides include: phthalic anhydride; 3-methylphthalic anhydride; 4-methylphthalic anhydride; trimellitic anhydride; 1,8 naphthalic anhydride; 3-nitrophthalic anhydride; 3-nitro-1,8-naphthalic anhydride; p-chlorophthalic anhydride, tetrabromophthalic anhydride; tetrachlorophthalic anhydride; naphthalene tetracarboxylic acid dianhydride; 1,2,4,5 benzenetetracarboxylic dianhydride; 3,3',4,4'-benzophenonetetracarboxylic dianhydride; 3,4,9,10-perylenetetracarboxylic dianhydride. Among the suitable saturated alicyclic carboxylic acid anhydrides are: hexahydrophthalic anhydride; cis/1,2 cyclohexane dicarboxylic anhydride; trans 1,2 cyclohexane dicarboxylic anhydride; cyclooctane-1,2-dicarboxylic anhydride; cis 1,2-cyclobutane dicarboxylic anhydride; 1,2,3,4-cyclobutane tetracarboxylic dianhydride; 1,2,3,4-cyclopentane tetracarboxylic dianhydride; cyclohexane-1,2-dicarboxylic anhydride; 4-methylhexane-1,2-dicarboxylic anhydride; and cyclopentane-1,2-dicarboxylic anhydride. Among the unsaturated alicyclic carboxylic acid anhydrides which may be employed are: the maleic anhydride adduct of methyl cyclopentadiene; dimethyl substituted butenyltetrahydrophthalic anhydride; tetrahydrophthalic anhydride; and methyl tetrahydrophthalic anhydride.

Representative of the heterocyclic carboxylic acid anhydrides which may be employed are: tetrahydrofuran 2,3,4,5-tetracarboxylic dianhydride; 7 oxabicyclo[2.2.1]hept-5-ene-2,3-dicarboxylic anhydride; 7-heptane-2,3-dicarboxylic anhydride; 5-chloroisatoic anhydride; diglycolic anhydride; and 2,3-pyridinedicarboxylic anhydride.

Included among the many polymeric carboxylic acid anhydrides which may be employed as crosslinking agents in the powder paint compositions of the invention: poly(azelaic anhydride); poly(sebasic anhydride); poly(adipic anhydride); poly(pimelic anhydride; and poly(suberic anhydride).

Although any of the anhydrides or mixtures of anhydrides selected from the above-discussed classes of anhydrides may be employed, the following anhydrides are preferred: phthalic anhydride; p-chlorophthalic anhydride; tetrabromophthalic anhydride; cyclohexane 1,2 dicarboxylic anhydride; 4 methylhexane -1,2-dicarboxylic anhydride; cyclopentane-1,2-dicarboxylic anhydride; succinic anhydride, dodecenyl succinic anhydride; maleic anhydride; methyl succinic anhydride; poly(azelaic anhydride); poly(sebasic anhydride); poly(suberic anhydride); 3-methyl phthalic anhydride; 4-methylphthalic anhydride; trimellitic anhydride; 3-nitrophthalic anhydride; 3,3',4,4'-benzophenone tetracarboxylic dianhydride; the maleic anhydride adduct of methylcyclopentadiene; dimethyl substituted butenyl tetradrophthalic anhydride; hexahydrophthalic anhydride; tetrahydrophthalic anhydride; methyltetrahydrophthalic anhydride; Cis 1,2-cyclobutane dicarboxylic anhydride; bromomaleic anhydride; tetrahydrofuran 2,3,4,5 tetracarboxylic dianhydride; 7 oxabicyclo [2.2.1] hept-5-ene-2,3-dicarboxylic anhydride; diglycolic anhydride; pyridine dicarboxylic anhydride; citraconic anhydride; itaconic anhydride 2,2 dimethylglutaric anhydride; 3,3-dimethylglutaric anhydride; dimethyl maleic anhydride; and 2-phenyl glutaric anhydride. Of the above-listed preferred anhydrides, the first eleven of the list (i.e., phthalic anhydride through poly(azelaic anhydride) are the most preferred.

Additional Additives

The coating compositions formed in accordance with the teachings of this invention may include a small amount, generally from about 0.05% by weight to about 1.0% by weight of the total weight of the powder composition, of a catalyst in order to increase the crosslinking rate of the powder coating during baking. Baking temperatures ordinarily are in the range of about 130° C to about 200° C and the catalyst should produce a gel time at the baking temperature of between about 1 minute and about 40 minutes. Preferably, however, the gel time is in the range of about 1 to about 12 minutes and most preferably is in the range of about 2 to about 8 minutes. Among the many suitable catalysts, which are preferably solid at room temperature and have a melting point of from 50° C to 200° C are tetralkylammonium salts, imidazole type catalysts, tertiary amines and metal salts of organic carboxylic acids. Suitable tetraalkyl ammonium salt catalysts include: tetrabutyl ammonium chloride (bromide or iodide); tetraethyl ammonium chloride (bromide or iodide); tetramethyl ammonium chloride (bromide or iodide); trimethyl benzyl ammonium chloride, dodecenyl dimethyl (2-phenoxyethyl)ammonium bromide and diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl]-2-imidazoline phosphate and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acids which are catalysts for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutl tin dilaurate and lithium benzoate.

The powder paint composition also may advantageously include a flow control agent in an amount ranging from about 0.05 weight percent to about 4.0 weight percent of the total powder composition. In general the flow control agent should be a polymer having a number average molecular weight of at least 1,000 and a glass transition temperature at least 50° C below the glass transition temperature of the epoxy functional copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight ($\overline{M}_n$) above 1,000, preferably about 5,000 and most preferably between about 6,000 and about 20,000. Among the preferred acrylic polymers useful as flow control agents as polylauryl acrylate, polybutyl acrylate, poly (2-ethylhexyl acrylate), polylauryl methacrylate and polyisodecyl methacrylate.

Although acrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight of over 2500 and perfluoroctanoic acid is a useful flow control agent. Polymeric siloxanes of molecular weight ($\overline{M}_n$) over 1,000, advantageously 1,000 to 20,000, may also be useful as flow control agents, e.g., alkyl substituted siloxanes such as polydimethyl siloxane, polymethylphenyl siloxane, polydiphenylsiloxane, etc. and halogenated siloxanes such as poly(3,3,3-trifluoropropylmethyl siloxane), poly (perfluorodimethyl siloxane), poly(pentafluorophenylmethyl siloxane), etc.

Since the powder coating composition of the invention may be applied to articles by electrostatic spray techniques, the composition may include a small weight percent of an antistatic agent. In particular, the antistatic agent is included in a range of from about 0.05 to about 1.0 weight percent of the total powder composition. Suitable antistatic agents include, but are not limited to, tetraalkyl ammonium salts as discussed previously and which also serve as catalysts. Other suitable antistatic agents include: alkyl poly (ethyleneoxy) phosphate or alkylaryl poly(ethyleneoxy) phosphates such as ethyl benzyl poly(ethyleneoxy) phosphate; polyethyleneimine; poly (2-vinyl pyroolidone); pyridinium chloride; poly(vinyl pyridinium chloride); polyvinyl alcohol; and inorganic salts.

A plasticizer may be used in the powder coating compositions of this invention if desired. The types of plasticizers used very often include adipates, phosphates, phthalates, sebacates, polyesters derived from adipic acid or azelaic acid, and epoxy or epoxidized plasticizers. Exemplary of the many plasticizers which may be employed are: dihexyl adipate; diisooctyl adipate; dicyclohexyl adipate; triphenyl phosphate; tricrecyl phosphate; tributyl phosphate; dibutylphthalate; dioctylphthalate; butyl octyl phthalate; dioctyl sebacate; butyl benzyl sebacate; dibenzyl sebacate, butanediol-1,4-diglycidyl ether and cellulose acetate butyrate.

In order to give individual powder coating compositions a suitable color, a pigment may be included. In general the pigment forms from about 6 to about 35 weight percent of the total powder coating composition. Pigments which are suitable for powder coating compositions include, but are not limited to the following: basic lead silica chromate 30 percent by weight (orange); titanium dioxide, 30 percent by weight (white); titanium dioxide, 15 weight percent plus ultra marine blue, 10 weight percent (blue); phthalocyanine blue, 7 weight percent, plus titanium dioxide, 10 weight percent (blue); phthalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 10 weight percent (green); quindo red, 5 weight percent, plus titanium dioxide, 16 weight percent (red); and iron oxide transparent orange pigment, 10 weight percent (orange). Metallic pigment such as aluminum may also be included up to 10 weight percent to give the baked coating a metallic appearance.

Having described the various materials which are employed in formulating the powder coating compositions of this invnetion, a plurality of examples are hereinafter set forth to illustrate the same. It should be understood that the specific examples are presented by way of illustration and not by way of limitation.

EXAMPLE I

The monomers, glycidyl methacrylate 15% by weight, methyl methacrylate 45% by weight and butyl methacrylate 40% by weight are mixed together. Three weight percent of a catalyst 2,2'-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109° C–112° C) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110° C. Drying is continued until the solvent content of the copolymer is below 3 percent. The trasy are cooled and the copolymer collected and ground to pass through 20 mesh screen. The copolymer has a glass transition temperature of 53° C and a molecular weight ($\overline{M}_n$) of 4000.

One hundred parts by weight of the ground copolymer are mixed with the following materials:

Succinic anhydride: 10.6 parts
Tetrabutyl ammonium bromide: 0.2 parts
Polylauryl acrylate ($\overline{M}_n = 10,000$): 0.5 parts
Titanium dioxide: 30 parts The materials are mixed together in a ball mill for 2 hours. The mixture is milled rolled at 85° C to 90° C for 5 minutes. The solid obtained is ground in a ball mill to pass through a 140 mesh screen.

The resulting powder thus obtained is a powder coating composition of the invention. The powder is sprayed on an electrically grounded, steel panel by using electrostatic powder spray gun operating at 50 KV charging voltage. After spraying, the panel is heated at 175° C for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE II

The procedure of Example I is repeated with the exception that 25 parts of dodecenyl succinic anhydride is employed ad the crosslinking agent. The resultant powder is sprayed on steel test panels and heated to cure. The coating exhibits good adhesion and solvent resistance.

EXAMPLE III

The procedure of Example I is repeated. The formation of the copolymer, however, begins with a monomer mixture having glycidyl methacrylate 5% by weight, methyl methacrylate 55% by weight and butyl methacrylate 40% by weight. Three weight percent of the catalyst AIBN is employed. When the procedure of Example I is followed, the resulting copolymer has a glass transition temperature of 58° C and a molecular weight of 4000.

One hundred parts of the copolymer produced is mixed with the same additional ingredients set forth in Example I, except using 3.4 parts maleic anhydride. The quality of the painted panels obtained after application of the powder coating to various materials is about the same as achieved in Example I.

EXAMPLE IV

The procedure of Example I is repeated with the exception that (1) the copolymer comprises 5% by weight glycidyl methacrylate, 55% by weight methyl methacrylate and 40% by weight butyl methacrylate and (2) 4.4 parts of dimethyl maleic anhydride is employed as the crosslinking agent. Painted panels formed from the powder exhibit good adhesion and solvent resistance.

EXAMPLE V

A monomer mixture having the following composition is prepared: glycidyl methacrylate 12% by weight, methyl methacrylate 48% by weight, and butyl methacrylate 40% by weight. The monomer mixture is processed in the same manner as described in Example I with 3% by weight of the catalyst AIBN employed. The resulting copolymer has a glass transition temperature of 56° C and a molecular weight of 4000. One hundred parts of the copolymer produced is mixed with the same additional ingredients described in Example I, except 9.4 parts itaconic anhydride are used.

The powder coating composition obtained by following the process steps set forth in Example I is applied to test panels in the same manner as described in Example I. The coating is baked at a temperature of 170° C for 30 minutes. The coating obtained has good adhesion to steel, glass, brass, zinc, aluminum, copper and bronze.

EXAMPLE VI

A monomer mixture having the following composition is prepared: glycidyl acrylate 12% by weight, methyl methacrylate 48% by weight and butyl methacrylate 40% by weight. The monomer mixture is processed in the same manner as described in Example I and 100 parts of the resultant copolymer is combined with the same additional ingredients as in Example I with the exception that 10.0 parts of citraconic anhydride is employed as the crosslinking agent.

EXAMPLE VII

A monomer mixture having the following composition is prepared: glycidyl methacrylate 20% by weight, methyl methacrylate 40% by weight and butyl methacrylate 40% by weight. A copolymer is formed from this monomer mixture in accordance with the same procedure as is outlined in Example I. In this case, 1% by weight of the catalyst AIBN is added. The copolymer produced has a glass transition temperature of 51° C and a molecular weight of 8500.

The ground copolymer (100 parts by weight) is added to the following materials:
Glutaric anhydride: 16.0 parts
Tetrabutylammonium chloride: 0.1 parts
Polybutylacrylate ($\overline{M}_n = 9000$): 4 parts
Titanium dioxide: 15 parts
Transparent blue: 4 parts
Metallic aluminum flakes: 4 parts The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 200° C for 10 minutes is of good quality, is solvent and scratch resistant, and has a metallic appearance.

EXAMPLE VIII

The procedure of Example VII is repeated with the exception that 8 parts of 2,2 dimethylglutaric anhydride are employed as the crosslinking agent.

EXAMPLE IX

A monomer mixture having the following composition is prepared: glycidyl methacrylate 25% by weight, methyl methacrylate 40% by weight and butyl methacrylate 35% by weight. The monomers are reacted as described in Example I to produce a copolymer. In this case, 6% by weight of the catalyst AIBN is employed. The resulting copolymer has a glass transition temperature of 53° C and a molecular weight of 2000.

One hundred parts by weight of the copolymer obtained is mixed with the following materials:
Glutaric anhydride: 20.0 parts
2-methyl-4-ethylimidazole: 0.05 parts
Dibutyl poly(ethyleneoxy)phosphate: 0.05 parts
Polyisododecyl methacrylate: 4 parts
Titanium dioxide: 10 parts
Phthalocyanine blue: 7 parts A powder coating composition is obtained by following the process steps set forth in Example I. The coating composition is applied to a series of test panels and baked at the temperature of and for the same time as Example IV. The coating obtained on the various test panels is of poor quality with respect to its adhesion, appearance and impact characteristics.

EXAMPLE X

The procedure of Example IX is repeated with the exception that 25 parts of 3,3 dimethylglutaric anhydride is employed as the crosslinking agent.

EXAMPLE XI

A monomer mixture having the following composition is prepared: glycidyl methacrylate 15% by weight, butyl acrylate 20% by weight and methyl methacrylate 65% by weight. The monomer is reacted as set forth in Example I in order to produce a copolymer. Four percent by weight of the catalyst AIBN is employed in reacting the monomer mixture to form the copolymer. The copolymer has a glass transition temperature of 65° C and a molecular weight of 3000.

One hundred parts by weight of the copolymer obtained is added to the following materials:
Phthalic anhydride: 15.6 parts
Triethylene diamine: 0.1 parts
Tetraethylammonium chloride: 0.5 parts
Polylaurylmethacrylate ($\overline{M}_n = 6000$): 2 parts
Phthalocyanine green: 7 parts
Titanium dioxide: 10 parts The above described materials are processed as described in Example I in order to produce a powder coating composition. The powder coating composition is applied to test panels as described in Example I and baked on the panels at a temperature of 150° C for 15 minutes.

The coating obtained has good adhesion to steel, glass, brass, zinc, aluminum, copper and bronze and is insoluble in toluene, gasoline, methanol and butanone.

EXAMPLE XII

A copolymer comprising 15% by weight glycidyl acrylate, 17% by weight butyl acrylate and 68% by weight methyl methacrylate is prepared in accordance with the procedure of Example I except that four percent by weight of the catalyst AIBN is employed in reacting the monomer mixture to form the copolymer.

One hundred parts by weight of the copolymer obtained is added to the following materials:
3-methyl phthalic anhydride: 17 parts
Triethylene diamine: 0.1 parts
Tetraethylammonium chloride: 0.5 parts
Polylaurylmethacrylate ($\overline{M}_n = 6,000$): 2 parts
Phthalocyanine green: 7 parts
Titanium dioxide: 10 parts These materials are then processed to form a powder coating composition.

EXAMPLE XIII

A monomer mixture having the following composition is prepared: glycidyl methacrylate 15% by weight, methyl methacrylate 50% by weight and styrene 35% by weight. The monomers are reacted in accordance with the procedure set forth in Example I with 3% by weight of the catalyst AIBN being utilized. The resulting ground copolymer has a molecular weight of 4500 and a glass transition temperature of 90° C.

One hundred parts by weight of the copolymer obtained is added to the following materials:
Tetrahydrophthalic anhydride: 16.2 parts
Tetramethylammonium chloride: 1 parts
Poly(2-ethylhexyl acrylate): 2 parts
Ferrite yellow: 7 parts
Titanium dioxide: 10 parts
Di (N-hexyl) adipate: 5 parts This mixture is processed as described in Example I in order to form a powder coating composition. The powder coating composition is applied to test panels as described in Example I. The panels are baked at a temperature of 180° C for 5 minutes. The adhesion quality of the powder coating after baking on the various test panels is good. The coating on each panel possesses good solvent and scratch resistance.

EXAMPLE XIV

The procedure of Example XIII is repeated with the exception that 20 parts of 4 methyl phthalic anhydride is used as the crosslinking agent.

EXAMPLE XV

A monomer mixture having the following composition is formed: glycidyl methacrylate 18% by weight, ethyl acrylate 20% by weight, methyl methacrylate 40% by weight, vinyl chloride 22% by weight. The monomer mixture is polymerized by using 2 weight percent of AIBN as the initiator.

One hundred parts of the ground copolymer obtained is added to the following materials:
Cyclohexane-1,2 dicarboxy anhydride: 18.6 parts
Trimethylbenzyl ammonium chloride: 0.1 parts
Poly(2-ethylhexyl acrylate)($\overline{M}_n = 11,000$): 2 parts
Carbon black: 6 parts The above materials are mixed and processed as set forth in Example I. The resulting powder coating composition is applied to test panels as specified in Example I. The coating composition is baked at 170° C for 15 minutes. All the painted panels exhibit good adhesion and solvent resistant properties.

EXAMPLE XVI

A copolymer comprising: 18% by weight glycidyl methacrylate, 20% by weight ethyl acrylate, 40% by weight methyl methacrylate and 22% vinyl chloride is prepared in accordance with Example I with the exception that 2 weight percent of AIBN is used as the initiator.

One hundred parts of the ground copolymer obtained is added to the following materials:
Cis 1,2 cyclobutane dicarboxylic anhydride: 18 parts
Trimethyl benzyl ammonium chloride: 0.1 parts
Poly(2-ethylhexyl acrylate)($\overline{M}_n = 11,000$): 2 parts
Carbon black: 6 parts

EXAMPLE XVII

A monomer mixture having the following composition is formed: glycidyl methacrylate 15% by weight, methyl methacrylate 30% by weight, isobutyl acrylate 25% by weight, alpha methyl styrene 15% by weight and methacrylonitrile 15% by weight. The monomer mixture is reacted in the same manner as described in Example I. Three percent of the catalyst AIBN is employed. The resulting copolymer has a glass transition temperature of 46° C and a molecular weight of 4500.

One hundred parts of the ground copolymer obtained is added to the following materials:
Trimellitic anhydride: 11.0 parts
Dodecyl dimethyl (2-phenoxy-ethyl) ammonium bromide: 0.5 parts
Polyethylene glycol perfluoro octanoate ($\overline{M}_n = 3400$): 2 parts
Black iron oxide: 10 parts The mixture so formed is processed as described in Example I to produce a powder coating composition. This powder coating composition is applied to test panels as described in Example I. The coating on each panel has good adhesion and solvent resistance.

EXAMPLE XVIII

The procedure of Example XVII is repeated with the exception that 16.2 parts of hexahydrophthalic anhydride is employed as the crosslinking agent.

EXAMPLE XIX

A monomer mixture having the following composition is prepared: glycidyl methacrylate 5% by weight, methyl methacrylate 55% by weight, and butyl methacrylate 40% by weight. The monomer mixture is reacted as described in Example I with 6% by weight of the catalyst AIBN. The resulting copolymer has a glass transition temperature of 55° C and a molecular weight of 3000.

One hundred parts by weight of the ground copolymer is mixed with the following materials:
3-nitrophthalic anhydride: 6.9 parts
Tetraethylammonium bromide: 1 part
Ethyl benzyl(ethyleneoxy) phosphate: 5 parts
Poly(2-ethylhexyl acrylate): 0.4 parts
Chromium green oxide: 8 parts
Titanium dioxide: 10 parts The above mixture is processed as described in Example I to produce a powder coating composition. The powder coating composition is applied to a plurality of test panels. The panels are baked at a temperature of 170° C for 20 minutes. The adhesion to the test panels of the powder coating material is good.

EXAMPLE XX

A copolymer comprising 5% by weight glycidyl acrylate, 55% by weight methyl methacrylate, 5% by weight methylacrylate, and 35% by weight butyl methacrylate is prepared in accordance with the procedure of Example I with the exception that 6% by weight of the catalyst AIBN is employed.

One hundred parts by weight of the ground copolymer is mixed with the following materials:
3,3',4,4'-benzophenone tetracarboxylic dianhydride: 5.9 parts
Tetraethyl ammonium bromide: 1 part
Ethyl benzyl (ethyleneoxy) phosphate: 5 parts
Poly(2-ethylhexyl acrylate): 0.4 parts
Chromium green oxide: 8 parts
Titanium dioxide: 10 parts The resulting powder when applied to steel panels and cured forms a coating exhibiting good adhesion and solvent resistance.

EXAMPLE XXI

A monomer mixture having the following composition is prepared: glycidyl methacrylate 22% by weight, n-hexyl methacrylate 20% by weight, butyl methacrylate 25% by weight and acrylonitrile 33% by weight. A copolymer is formed from this monomer mixture in accordance with the same procedure as is outlined in Example I. In this case, 1.5% by weight of the catalyst AIBN is added. The copolymer produced has a glass transition temperature of 40° C and a molecular weight of 7500.

The ground copolymer (100 parts by weight) is added to the following materials:
  Glutaric anhydride: 10.5 parts
  Zinc octoate: 0.8 parts
  Tetrabutylammonium iodide: 1.0 parts
  Polybutyl acrylate: 2.0 parts
  Iron oxide transparent orange: 4 parts
  Metallic aluminum flakes: 4 parts The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 140° C for 20 minutes is of poor quality and has a tendency to chip and crack.

EXAMPLE XXII

A copolymer comprising 20% by weight glycidyl acrylate, 10% by weight n-hexyl methacrylate, 23% by weight butyl methacrylate, 30% by weight acrylonitrile, and 17% by weight methyl methacrylate is prepared in accordance with Example I using 1.5% by weight AIBN.

The ground copolymer (100 parts by weight) is added to the following materials:
  Dimethyl substituted butenyl tetrahydrophthalic anhydride: 35 parts
  Zinc octoate: 0.8 parts
  Tetrabutyl ammonium iodide: 1.0 parts
  Polybutyl acrylate: 2.0 parts
  Iron oxide transparent orange: 4 parts
  Metallic aluminum flakes: 4 parts

EXAMPLE XXIII

A monomer mixture is formed having the following composition: glycidyl methacrylate 12% by weight, methyl methacrylate 50% by weight, 2-ethylhexyl acrylate 10% by weight and acrylonitrile 28% by weight. The monomer mixture is processed as set forth in Example I in order to form a copolymer. Four percent by weight of the catalyst AIBN is added. The copolymer formed has a glass transition temperature of 60° C and a molecular weight of 4000.

One hundred parts by weight of the ground copolymer is mixed with the following materials:
  Octric anhydride: 15.5 parts
  Stannous octanoate: 0.5 parts
  Tetraethylammonium bromide: 0.05 parts
  Polyethylene glycol perfluoro octonoate ($\overline{M}_n = 3500$): 2 parts
  Quindo red: 4 parts
  Metallic aluminum flakes: 4 parts The mixture above described is processed as set forth in Example I to produce a powder coating composition. The powder coating composition is applied to test panels as described in Example I. The panels are baked at 150° C for 20 minutes. The adhesion to the panels of the powder coating is good, each of the coating possesses good solvent resistance and has a metallic appearance.

EXAMPLE XXIV

The procedure of Example XXIII is repeated with the exception that 14 parts of methyltetrahydrophthalic anhydride is substituted as the crosslinking agent.

EXAMPLE XXV

A monomer mixture having the following compositions is prepared: glycidyl methacrylate 10% by weight, methyl methacrylate 45% by weight, butyl methacrylate 35% by weight and vinyl acetate 10% by weight. A copolymer is formed from this monomer mixture in accordance with the same procedure as is outlined in Example I. In this case, 3% by weight of the catalyst AIBN is added.

The ground copolymer (100 parts by weight) is added to the following materials:
  Bromomaleic anhydride: 12.4 parts
  Tetrabutylammonium bromide: 2 parts
  Poly (2-ethylhexyl acrylate): 3.5 parts
  Carbon black: 6 parts The above ingredients are mixed together and processed in accordance with the procedure of Example I to obtain a powder coating composition. The powder coating composition is sprayed on various test panels. The coating obtained on each test panel after curing of the powder coating composition at a temperature of 160° C for 10 minutes is of good quality. Also, the coating obtained on each test panel is insoluble in toluene, gasoline, methanol and butanone.

EXAMPLE XXVI

A copolymer comprising 10% by weight glycidyl acrylate, 45% by weight methyl methacrylate, 35% by weight butyl methacrylate and 10% by weight vinyl acetate is prepared in accordance with the procedure of Example I.

The ground copolymer (100 parts by weight) is added to the following materials:
  Tetrahydrofuran 2,3,4,5 tetracarboxylic dianhydride: 8.2 parts
  Tetrabutylammonium bromide: 2 parts
  Poly (2-ethylhexyl acrylate): 3.5 parts
  Carbon black: 6 parts

EXAMPLE XXVII

A monomer mixture having the following composition is prepared: glycidyl methacrylate 8% by weight, methyl methacrylate 52% by weight and isobutyl methacrylate 40% by weight. A copolymer is formed from this monomer mixture in accordance with the same procedure as is outlined in Example I. In this case, 5% by weight of the catalyst AIBN is added. The copolymer produced has a glass transition temperature of 75° C and a molecular weight of 3200.

The ground copolymer (100 parts by weight) is added to the following materials:
  7 oxabicyclo [2.2.1] hept-5-ene-2,3-dicarboxylic anhydride: 9.3 parts
  Tetrabutylammonium bromide: 2 parts
  Polylauryl acrylate: 4 parts
  Titanium dioxide: 30 parts
  Dioctyl sebacate: 5 parts The above ingredients are mixed together and processed in accordance with the procedure of Example I to obtain a powder coating composition. The powder coating composition is sprayed on various test panels of steel, brass, glass, zinc, aluminum, copper and bronze.

The coating obtained on each test panel after curing of the powder coating composition at a temperature of 130° C for 10 minutes is of good quality and is solvent and scratch resistant.

EXAMPLE XXVIII

A copolymer comprising 8% by weight glycidyl acrylate, 42% by weight methyl acrylate, 40% by weight isobutyl methacrylate and 10% by weight styrene is prepared in accordance with the procedure outlined in Example I with the exception that 5% by weight of AIBN is used.

The ground copolymer (100 parts by weight) is mixed with the following:
  Diglycolic anhydride: 7.2 parts
  Tetrabutylammonium bromide: 2 parts
  Polylaurylacrylate: 4 parts
  Titanium dioxide: 30 parts
  Dioctyl sebacate: 5 parts The resultant mixture is processed in accordance with Example I. Coatings formed from the powder exhibit good adhesion, solvent resistance and scratch resistance.

EXAMPLE XXIX

A monomer mixture having the following composition is prepared: glycidyl acrylate 10% by weight, methyl methacrylate 67% by weight, and n-butyl methacrylate 23% by weight. A copolymer is formed from this monomer mixture in accordance with the procedure as is outlined in Example I. In this case, 4% by weight of the catalyst AIBN is added. The copolymer produced has a glass transition temperature of 73° C and a molecular weight of 3000.

The ground copolymer (100 parts by weight) is added to the following materials:
  Tetrabromophthalic anhydride: 32 parts
  Tetrabutylammonium chloride: 0.7 parts
  Polybutyl acrylate: 2 parts
  Titanium dioxide: 30 parts The above ingredients are mixed together and processed in accordance with the procedure of Example I to obtain a powder coating composition. The powder coating composition is sprayed on various test panels. The coating obtained on each test panel after curing of the powder coating composition at a temperature of 180° C for 15 minutes is of good quality. Also, each of the test panels coating's is resistant to and insoluble in toluene, gasoline, methanol and butanone.

EXAMPLE XXX

The procedure of Example XXIX is repeated with the exception that 10.5 parts of pyridine dicarboxylic anhydride is employed as the crosslinking agent.

EXAMPLE XXXI

A monomer mixture having the following composition is prepared: glycidyl acrylate 15% by weight, methyl methacrylate 32% by weight, ethyl acrylate 15% by weight, isobutyl acrylate 8% by weight, and styrene 30% by weight. A copolymer is formed from this monomer mixture in accordance with the same procedure as is outlined in Example I. In this case, 3% by weight of the catalyst AIBN is added.

The ground copolymer (100 parts by weight) is added to the following materials:
  Poly(azelaic anhydride) 18 parts
  Tetraethylammonium bromide 1 part
  Polyisodecyl methacrylate ($\overline{M}_n = 5000$) 1.5 parts
  Titanium dioxide 30 parts The above ingredients are mixed together and processed in accordance with the procedure of Example I to obtain a powder coating composition. The powder coating composition is sprayed on various test panels of steel, glass, brass, zinc, aluminum, copper and bronze. The coatings obtained on each test panel after curing of the powder coating composition at a temperature of 140° C for 15 minutes is of good quality and has good adhesion characteristics. The powder coating composition on each panel is resistant to the solvents previously metnioned.

EXAMPLE XXXII

The procedure of Example XXXI is repeated with the exception that 21.4 parts of poly(sebacic anhydride) is employed as the crosslinking agent. The resultant coatings exhibit good adhesion, solvent resistance and scratch resistance.

EXAMPLE XXXIII

A monomer mixture having the following composition is prepared: glycidyl methacrylate 15% by weight, methyl methacrylate 40% by weight, 2-ethylhexyl acrylate 15% by weight, alpha methyl styrene 20% by weight, and acrylonitrile 10% by weight. A copolymer is formed from this monomer mixture using 4% by weight of the catalyst AIBN.

The ground polymer (100 parts by weight) is added to the following materials:
  P-chlorophthalic anhydride: 18 parts
  Tetraethylammonium bromide: 0.4 parts
  Poly(2-ethylhexyl acrylate): 2 parts
  Titanium dioxide: 30 parts The above ingredients are mixed together and processed in accordance with the procedure of Example I to obtain a powder coating composition. The powder coating composition is sprayed on various test panels of steel, brass, zinc, aluminum, copper and bronze. The coating obtained on each test panel after curing of the powder coating composition at a temperature of 170° C for 20 minutes is of good quality and resistant to the aforementioned solvents.

EXAMPLE XXXIV

The procedure of Example XXXIII is repeated with the exception that 20.0 parts of 2-phenyl glutaric anhydride is employed as the crosslinking agent.

EXAMPLE XXXV

A monomer mixture having the following composition is prepared: glycidyl methacrylate 20% by weight, butyl acrylate 40% by weight, methyl methacrylate 10% by weight and styrene 30% by weight. A copolymer is formed from this monomer mixture in accordance with the same procedure as is outlined in Example I. In this case, 4% by weight of the catalyst AIBN is added. The copolymer produced has a glass transition temperature of 40° C and a molecular weight of 3,000.

The ground copolymer (100 parts by weight) is added to the following materials:
  Cyclopentane-1,2-dicarboxylic anhydride: 15 parts
  Tetraethylammonium bromide: 0.5 parts
  Polylauryl acrylate: 1.0 parts
  Titanium dioxide: 30 parts The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 180° C for 10 minutes is of good quality and is resistant to the aforementioned solvents.

EXAMPLE XXXVI

A monomer mixture having the following composition is prepared: glycidyl methacrylate 15% by weight, butyl methacrylate 15% by weight, ethyl acrylate 15% by weight, methyl methacrylate 30% by weight and styrene 25% by weight. A copolymer is formed from this monomer mixture in accordance with the same procedure as is outlined in Example I. In this case, 4% by weight of the catalyst AIBN is added.

The ground copolymer (100 parts by weight) is added to the following materials:
Methyl succinic anhydride: 11 parts
Tetraethylammonium bromide: 1.0 parts
Polylauryl acrylate: 0.5 parts
Titanium dioxide: 30 parts The above ingredients are mixed together and processed in accordance with the procedure of Example I to obtain a powder coating composition. The powder coating composition is sprayed on various test panels of steel, brass, zinc, aluminum, copper and bronze. The coating obtained on each test panel after curing of the powder coating composition at a temperature of 130° C for 30 minutes is of good quality and resistant to the aforementioned solvents.

EXAMPLE XXXVII

The procedure of Example XXXVI is repeated with the exception that 16.5 parts of poly(suberic anhydride) is used as the crosslinking agent.

EXAMPLE XXXVIII

A monomer mixture having the following composition is prepared: glycidyl methacrylate 15% by weight, 2-ethylhexyl acrylate 10% by weight, methyl methacrylate 50% by weight, methacrylonitrile 15% by weight and alpha methyl styrene 10% by weight. A copolymer is formed from this monomer mixture in accordance with the same procedure as is outlined in Example I. In this case, 4% by weight of the catalyst AIBN is added.

The ground copolymer (100 parts by weight) is added to the following materials:
Methyl cyclohexane-1,2-dicarboxylic anhydride: 17 parts
Tetraethylammonium bromide: 0.5 parts
Polylauryl acrylate: 2.5 parts
Titanium dioxide: 30 parts The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 135° C for 30 minutes is of good quality. Also, the coatings are resistant to an insoluble in toluene, gasoline, methanol and butanone.

EXAMPLE XXXIX

The procedure of Example XXXVIII is repeated with the exception that the crosslinking agent comprises a mixture of 9 parts poly(azelaic anhydride) and 8.25 parts of poly(suberic anhydride).

EXAMPLE XXXX

The procedure of Example XXV is repeated with the exception that the crosslinking agent comprises a mixture of 6.2 parts bromomaleic anhydride and 3.4 parts succinic anhydride.

EXAMPLE XXXXI

The procedure of Examples I - IV are repeated with the exception that an equivalent amount of polydimethyl siloxane ($\overline{M}_n=10,000$) is substituted for the polylauryl acrylate flow control agent.

EXAMPLE XXXXII

The procedure of Example VII is repeated with the exception that 0.7 parts of polydiphenyl siloxane ($\overline{M}_n=6000$) is used as the flow control agent.

EXAMPLE XXXXIII

The procedure of Example XII is repeated with the exception that 0.9 parts of polymethylphenyl siloxane ($\overline{M}_n=6000$) is employed as the flow control agent.

EXAMPLE XXXXIV

The procedure of Example XV is repeated with the exception that 0.6 parts of poly(3,3,3 trifluoropropylmethyl siloxane) ($\overline{M}_n=11,000$) is used as the flow control agent.

EXAMPLE XXXV

The procedure of Example XXIII is repeated with the exception that 0.8 parts of poly(perfluorodimethyl siloxane) ($\overline{M}_n=3,000$) is used as the flow control agent.

EXAMPLE XXXXVI

The procedure of Example XXV is repeated with the exception that 0.3 parts of poly(pentafluorophenylmethyl siloxane) ($\overline{M}_n=15,000$) is used as the flow control agent.

Having described the various materials which are employed in formulating the powder coating composition of this invention, a plurality of examples are hereinafter set forth to illustrate the same. It should be understood that the specific examples are presented by way of illustration and not by way of limitation.

We claim:
1. A powder coating composition which, exclusive of pigments and other nonreactive components, comprises a coreactable mixture of: (A) a copolymer of about 5 to about 20 weight percent of a glycidyl ester of a monoethylenically unsaturated acid and about 95 to about 80 weight percent of other monoethylenically unsaturated monomers, said copolymer having a glass transition temperature in the range of 40° C to 90° C and a molecular weight ($\overline{M}_n$) in the range of 2500 to 8500; and (B) an organic carboxylic acid anhydride crosslinking agent in the amount of between about 0.4 and about 1.0 anhydride groups for each epoxy group in the copolymer.

2. A powder coating composition in accordance with claim 1 wherein said copolymer has a glass transition temperature between about 50° C and about 80° C and a molecular weight ($\overline{M}_n$) between about 3000 and about 6500.

3. A powder coating composition in accordance with claim 1 wherein said copolymer has a glass transition temperature between about 55° C and about 70° C and a molecular weight ($\overline{M}_n$) between about 3000 and about 4000.

4. A powder coating composition in accordance with claim 1 wherein said monoethylenically unsaturated monomers consist essentially of monofunctional, alpha-beta olefinically unsaturated monomers selected from acrylates or mixtures of acrylates and monovinyl hydrocarbons.

5. A powder coating composition in accordance with claim 4 wherein said alpha-beta olefinically unsaturated monomers consist essentially of esters of $C_1 - C_8$ monohydric alcohols and acrylic or methacrylic acid.

6. A powder coating composition in accordance with claim 4 wherein modifying monomers selected from the group consisting of alpha methyl styrene, acrylonitrile, methacrylonitrile and chlorostyrene are included in an amount ranging between about 0 weight percent and about 35 weight percent of said copolymer.

7. A powder coating composition in accordance with claim 1 wherein said anhydride crosslinking agent is an anhydride of a saturated, aliphatic carboxylic acid containing between about 4 and about 20 carbon atoms.

8. A powder coating composition in accordance with claim 1 wherein said anhydride crosslinking agent is in anhydride of an unsaturated, aliphatic carboxylic acid containing between about 4 and about 20 carbon atoms.

9. A powder coating composition in accordance with claim 1 wherein said anhydride crosslinking agent is an anhydride of an aromatic carboxylic acid.

10. A powder coating composition in accordance with claim 1 wherein said anhydride crosslinking agent is an anhydride of a saturated alicyclic carboxylic acid.

11. A powder coating composition in accordance with claim 1 wherein said anhydride crosslinking agent is an anhydride of an unsaturated alicyclic carboxylic acid.

12. A powder coating composition in accordance with claim 1 wherein said anhydride crosslinking agent is an anhydride of a heterocyclic carboxylic acid.

13. A powder coating composition in accordance with claim 1 wherein said anhydride is a polymer of a saturated aliphatic carboxylic acid.

14. A powder coating composition in accordance with claim 1 wherein said anhydride is a polymer of an unsaturated, aliphatic carboxylic acid.

15. A powder coating composition which, exclusive of pigments and other nonreactive components, comprises a coreactable mixture of: (A) a copolymer of about 5 to about 20 weight percent of a glycidyl ester of a monoethylenically unsaturated acid and about 95 to about 80 weight percent of other monoethylenically unsaturated monomers consisting essentially of monofunctional, alpha-beta olefinically unsaturated monomers, said copolymer having a glass transition temperature in the range of 40° C to 90° C and a molecular weight ($\overline{M}_n$) in the range of 2500 to 8500; and (B) an organic carboxylic acid anhydride selected from the group consisting of anhydrides of saturated aliphatic carboxylic acids containing between about 4 and about 20 carbon atoms, unsaturated aliphatic carboxylic acids containing between about 4 and about 20 carbons, atomatic carboxylic acids; saturated, alicyclic carboxylic acids; unsaturated, alicyclic carboxylic acids; heterocyclic carboxylic acids; and polymers of saturated or unsaturated carboxylic acids, said anhydride being included in an amount ranging from about 0.4 to about 1.0 anhydride groups per epoxy group in the copolymer.

16. A powder coating composition in accordance with claim 15 wherein said copolymer has a glass transition temperature between about 50° C and about 80° C and a molecular weight ($\overline{M}_n$) between about 3000 and about 6500.

17. A powder coating composition in accordance with claim 15 wherein said copolymer has a glass transition temperature between about 60° C and about 70° C and a molecular weight ($\overline{M}_n$) between about 3000 and about 4000.

18. A powder coating composition in accordance with claim 15 wherein said monoethylenically unsaturated monomers consist essentially of $C_1 - C_8$ monohydric alcohols and acrylic or methacrylic acid.

* * * * *